United States Patent Office 3,370,038
Patented Feb. 20, 1968

3,370,038
NOVEL EPOXIDE RESINS PREPARED FROM α,α',α"-TRIS(HYDROXYPHENYL)-1,3,5 - TRIISOPROPYL-BENZENE AND 1,4 - BIS(p - HYDROXYCUMYL) BENZENE
Oliver A. Barton, Florham Park, and Ralph M. Hetterly, Morristown, N.J., assignors to Allied Chemical Corporation, New York, N.Y., a corporation of New York
No Drawing. Filed Aug. 18, 1965, Ser. No. 480,777
6 Claims. (Cl. 260—47)

ABSTRACT OF THE DISCLOSURE

This specification discloses novel terpolymeric epoxides prepared by reacting α,α',α"-tris(hydroxyphenyl)-1,3,5-triisopropylbenzene, 1,4-bis(p-hydroxycumyl)benzene and epichlorohydrin in the presence of an alkali. When cured, the epoxides of the invention have surprisingly high heat distortion temperatures.

---

Epoxide resins and processes for their production by the reaction of dihydric phenols and epichlorohydrin in the presence of a condensing agent such as caustic soda are well known. Such resins vary in their physical state from liquids to semi-solids to solids and are generally cured to thermoset condition by heating in the presence of chemical hardening agents such as aromatic amines. Resins produced by such curing have a high molecular weight which renders them particularly suitable for use as coatings, adhesives, and laminates and for use as potting and encapsulating compositions. U.S. Patent 3,293,213 issued Dec. 20, 1966, to Barton and Schwartz, assigned to this assignee, discloses new terpolymeric resins of the above-mentioned types, which have greater hardness and resistance to chemical attack, prepared by a process which includes the interaction of 1,4-bis(p-hydroxycumyl)benzene with an epoxide resin prepared by 2,2-bis(p-hydroxyphenyl) propane and epichlorohydrin.

One property of cured epoxide resins which is extremely desirable and useful is a high heat distortion temperature with its attendant good resistance to solvents and electricity. This property is especially useful for heat resistant coatings and adhesives. High heat distortion temperatures will be realized in highly cross-linked cured resins of low molecular weight epoxides, wherein the proportion of reactive epoxide groups per gram of resin is large. This is measured as epoxide equivalent, which is defined as the weight of resin in grams that contains one gram equivalent of epoxy. When other conditions remain constant, i.e. curing agent and curing cycle, the heat distortion temperature in general increases with decreasing epoxide equivalent. This can be explained on the basis that as epoxide equivalent decreases, the proportion of reactive epoxide groups present per gram of resin through which cross-linking or curing occurs increases and correspondingly, the extent of crosslinking increases.

An advantage of low molecular weight epoxide resins is that they are liquid at room temperature and can be poured or allowed to flow into place without the need of solvents or heating. When employing highly reactive curing agents, an increase in temperature shortens the curing time so that it is difficult to utilize the resin before it cross-links to a solid material.

It is an object of this invention to provide new terpolymeric epoxide resins having high heat distortion temperatures when cured, and a process for producing them.

It is another object of this invention to provide new low molecular weight terpolymeric epoxide resins, and a process for producing them.

In accordance with this invention, low molecular weight terpolymeric epoxide resins having surprisingly high heat distortion temperatures when cured may be prepared by the reaction of α,α',α"-tris(hydroxyphenyl)-1,3,5-triisopropylbenzene, 1,4-bis(p-hydroxycumyl)benzene and epichlorohydrin in liquid phase.

More particularly, the terpolymeric epoxide resins may be prepared by heating, at a temperature of about 75° C. up to about reflux temperature, and preferably from about 90° C. to about 100° C., a reaction mixture comprising α,α',α"-tris(hydroxyphenyl)-1,3,5-triisopropylbenzene, 1,4-bis(p-hydroxycumyl)benzene, and epichlorohydrin in the presence of an alkali.

The bisphenol and trisphenol are present in a molar ratio between about 2:1 and about 10:1 of trisphenol to bisphenol. In order to prepare low molecular weight epoxide resins, a large excess of epichlorohydrin for each equivalent of phenol should be employed, and accordingly in the process of this invention an excess of about 5 up to about 50 mols of epichlorohydrin for each mol of total phenol reactants is used. The alkali present in the reaction mixture is preferably an alkali metal hydroxide such as sodium, potassium, or lithium hydroxide, and is present in an amount sufficient to neutralize the hydrochloric acid produced during the reaction, as well as to transform the chlorohydrin formed in the initial reaction of phenol and epichlorohydrin to an epoxide-containing molecule. Preferably this amount is between about 2 mols and about 4 mols of alkali per mol of total phenolic compounds.

A method of preparing the trisphenol of this invention, i.e. α,α',α"-tris(hydroxyphenyl)-1,3,5-triisopropylbenzene, may be found described in copending U.S. application Ser. No. 392,291, filed Aug. 26, 1964, by Vitrone et al. assigned to this assignee, now abandoned. The process consists of reacting α,α',α"-trihydroxy-1,3,5-triisopropylbenzene and phenol in the presence of an acidic condensation catalyst to yield the desired product. The structural formula may be represented as:

[Structure diagram of α,α',α"-tris(hydroxyphenyl)-1,3,5-triisopropylbenzene]

1,4 - bis(p - hydroxycumyl)benzene may be prepared according to the method described in copending U.S. application Ser. No. 140,221 by Broderick et al., filed Sept. 25, 1961, assigned to this assignee. The process consists of reacting the dicarbinol of 1,4-diisopropylbenzene with phenol in the presence of hydrogen chloride as a catalyst. The structural formula may be represented as:

[Structure diagram of 1,4-bis(p-hydroxycumyl)benzene]

While the exact structural formulas of the terpolymeric epoxide resins of this invention are not known they may be represented as having the following theoretical structural formula:

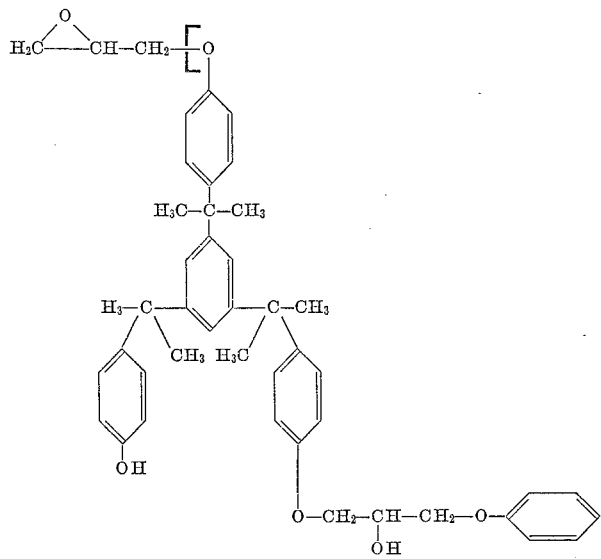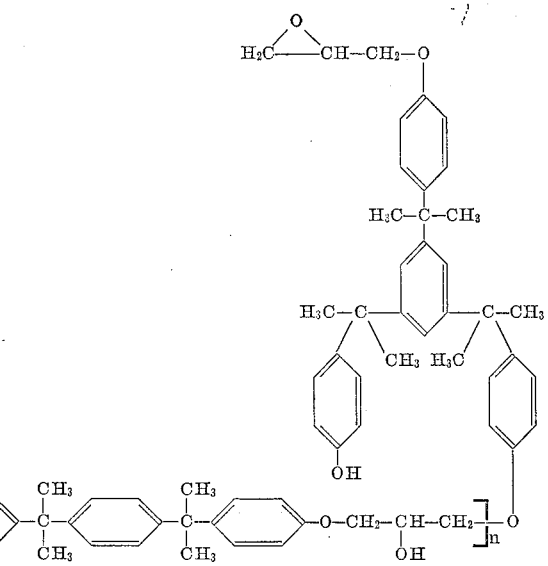

$n$ representing a number ranging up to about 25. It is to be understood, however, that the above structural formula represents an idealized version, and its exact composition may vary depending on the reaction conditions of the process. For example, epichlorohydrin could react with the remaining hydroxy groups on the trisphenol molecules as well.

It has been found that the presence of water has a pronounced influence upon the reaction of this invention. More specifically, it is preferred that water be present as a reaction-initiator in amount of at least 0.3% of the total weight of the reaction mixture. The amount of water preferably ranges from at least about 0.3% to about 5% of the total weight of the reaction mixture in the preparation of low molecular weight resins.

The crude reaction mixture obtained contains salts, excess alkali, unreacted epichlorohydrin, and water, all of which should be removed. This may be accomplished by dissolving the resin in a suitable aromatic solvent such as benzene, toluene, xylene, and the like, washing several times with water, and separating the aqueous and organic layers. The organic solvent is then distilled off. The resin may be further purified by dissolving in acetone, cooling to room temperature, filtering off any solid impurities, and evaporating the acetone. The final terpolymeric epoxide resin has an epoxide equivalent within the range of about 200 to about 260.

The terpolymeric epoxide resins prepared by this invention may be cured with conventional curing agents such as amines, organic polyacids and anhydrides, polyamides, Friedel-Crafts metal halides, phosphoric acid and partial esters thereof and salts of inorganic acids.

Illustrative of specific compounds which may be successfully emloyed as curing agents are as follows:

(1) *Amines.*—Diethylene triamine, diethylamino propylamine, ethylene diamine, triethylene tetramine, dimethylamino propylamine, m-phenylene diamine, triethylamine and benzyldimethylamine;

(2) *Organic poly acids and anhydrides.*—Oxalic acid, phthalic acid, phthalic anhydride, succinic anhydride, adipic acid, citric acid, 1,3-benzene disulfonic acid, maleic anhydride, hexahydrophthalic anhydride, pyromellitic dianhydride, dodecenyl succinic anhydride, tetrachlorophthalic anhydride and chlorendic anhydride;

(3) *Amines having reactive amino groups.*—Dicyandiamide, polyamide resins prepared by the reaction of a dimerized or trimerized vegetable oil, unsaturated fatty acid with aryl or alkyl polyamides such as the reaction product of linoleic acid dimer with ethylene diamine;

(4) *Friedel-Crafts metal halides.*—Aluminum chloride, zinc chloride, ferric chloride and boron trifluoride as well as complexes thereof with ethers, acid anhydrides, ketones, diazonium salts;

(5) *Phosphoric acid and partial esters thereof.*—n-Butyl dihydrogen orthophosphate, and diethyl orthophosphate;

(6) *Salts of inorganic acids.*—Zinc fluoborate, potassium persulfate, nickel fluoborate, copper fluoborate, selenium fluoborate, magnesium fluoborate, tin fluoborate, potassium magnesium arsenate, magnesium sulfate, cadmium arsenate, cadmium silicate, aluminum fluoborate, ferrous sulfate, ferrous silicate, manganese hypophosphite, nickel phosphate and nickel chlorate.

The preferred class of curing agents is the amino compounds. A number of these amino compounds such as diethylenetriamine and diethylamino propylamine are sufficiently active to effect curing at room temperature and such systems can be used for adhesives and other uses where it is usually not practical to require preheating. The best curing cycle must be determined for each curing agent used. When using an amine curing agent, it is best to provide one active hydrogen for each epoxide group of the resin. Thus, when curing a resin having an epoxide equivalent of about 200 with m-phenylene diamine, which has four active hydrogens and a molecular weight of 108, about 13.5 grams of the curing agent should be used for each 100 grams of resin. The amount of curing agent may be varied somewhat, but the variation should not be greater than about 5%.

The epoxide resins may be modified by reacting them with conventional epoxide modifying agents such as urea formaldehyde, phenol formaldehyde, and melamine formaldehyde. Additionally, the physical properties of the resin may be changed by dissolving therein a solid epoxide resin of higher epoxide equivalent.

This invention will be described further in conjunction with the following specific examples, which are not intended to limit the scope of this invention but are intended for purposes of illustration.

*Example 1*

To a reaction flask fitted with a stirrer, condenser, thermometer, and means of heating, was added 0.05 mol of 1,4-bis(p-hydroxycumyl)benzene, 0.45 mol of $\alpha,\alpha',\alpha''$-tris(hydroxyphenyl)-1,3,5-triisopropylbenzene, 5.0 mols of epichlorohydrin, and 0.38 mol of water. The temperature was raised to reflux while stirring continuously. 1.6 mols of sodium hydroxide pellets were added slowly so as to maintain reflux, but to avoid excessive heat. The mixture was stirred at reflux for an additional two hours and cooled to room temperature. The mixture was filtered through a coarse glass filter with a ¼-inch mat of Hyflo Super Cel, a silica compound sold by Johns-Manville Co., and useful as a filtering aid, to remove most of the salt. The remaining solvents were distilled off at 1 mm. pressure and 145° C.

The resin was further purified by dissolving in twice its volume of acetone, cooled to about 0° C. and filtered as above. The acetone was removed by vacuum distillation at 1 mm. pressure and 145° C. The resultant resin had an epoxide equivalent of 243.

*Example 2*

The procedure of Example 1 was repeated using 0.1 mol of 1,4-bis(p-hydroxycumyl)benzene and 0.4 mol of α,α′,α″-tris(hydroxyphenyl)-1,3,5-triisopropylbenzene. The resultant resin had an epoxide equivalent of 246.

No. 392,291 (above), said resin having an epoxide equivalent of 258, and an epoxide resin prepared from the reaction of 1,4-bis(p-hydroxycumyl)benzene with an excess of epichlorohydrin, said resin having an epoxide equivalent of 286.

In preparing the cured samples, the epoxide resins were first admixed with m-phenylene diamine at a temperature of about 80° C. using about 12 grams of curing agent per 100 grams of resin. The resin was then poured into molds and heated at 150° C. for six hours. The physical properties of the resins are given in the table below, wherein 1,4-bis(p-hydroxycumyl)benzene is abbreviated as "DCP" and α,α′,α″-tris(hydroxyphenyl)-1,3,5-triisopropylbenzene is abbreviated as "Tris." It will be noted that the cured products of Examples 1 to 3 prepared in accordance with the invention possess markedly superior heat distortion properties as compared with the cured products of Examples 4 and 5 in which the proportions of phenols used are outside the scope of the invention.

TABLE I

| Properties | ASTM Test No. | Ex. 1 Tris:DCP 9:1 | Ex. 2 Tris:DCP 4:1 | Ex. 3 Tris:DCP 7:3 | Ex. 4 Tris:DCP 1:1 | Ex. 5 Tris:DCP 1:2 | DCP Epoxide | Tris Epoxide |
|---|---|---|---|---|---|---|---|---|
| Epoxide Equivalent | | 243 | 246 | 243 | 291 | 296 | 286 | 258 |
| Color | | (1) | (1) | (1) | (1) | (1) | (2) | (1) |
| Ultimate Tensile Strength, p.s.i. | 638 | 9,680 | 8,120 | 10,520 | 7,800 | 8,060 | 6,957 | 8,741 |
| Ultimate Elongation, percent | 638 | 7.7 | 5.2 | 10.5 | 4.3 | 4.6 | 6.1 | 3.9 |
| Compressive Strength, p.s.i. | D695 | | 19,350 | 19,200 | 18,600 | 18,900 | 18,446 | 19,000 |
| Izod Impact, ft. lbs. per in. notch | 256 | .31 | .2 | .37 | .21 | 0.2 | .46 | .37 |
| Rockwell Hardness (M) | D785 | 126 | 125 | 125 | 125 | 122 | 107 | 112 |
| Heat Distortion Temp., °C | D648 | 161 | 161 | 167.5 | 133 | 122 | 131 | 145 |

1 Amber.
2 Lt. amber.

*Example 3*

To a flask as in Example 1 was added 0.15 mol of 1,4-bis(p-hydroxycumyl)benzene, 0.35 mol of α,α′,α″-tris(hydroxyphenyl)-1,3,5-triisopropylbenzene, 5.0 mols of epichlorohydrin and 0.37 mol of water, and the mixture stirred while heating to reflux. The terpolymeric epoxide was prepared as in Example 1. The resultant resin had an epoxide, equivalent of 243.

*Example 4*

To a flask as in Example 1 was added 0.2 mol of 1,4-bis(p-hydroxycumyl)benzene, 0.2 mol of α,α′,α″-tris(hydroxyphenyl)-1,3,5-triisopropylbenzene, 4.0 mols of epicholorhydrin and 0.27 mol of water. The mixture was stirred while heating to reflux. 1.2 mols of sodium hydroxide were added slowly and heating at reflux was continued for two hours. The procedure of Example 1 was used to purify the resin, which had an epoxide equivalent of 291.

*Example 5*

To a flask, as in Example 1, was added 0.2 mol of α,α′,α″-tris(hydroxyphenyl)-1,3,5-triisopropylbenzene, 0.4 mol 1,4-bis(p-hydroxycumyl)benzene, 6.0 mols of epicholorhydrin and 0.35 mol of water, and the mixture stirred while heating to reflux. The terpolymeric epoxide was prepared as in Example 1. The resultant resin had an epoxide equivalent of 296.

*Example 6*

Cured samples of the epoxide resins of Examples 1–5 were compared with cured samples of an epoxide resin prepared from the reaction of α,α′,α″-tris(hydroxyphenyl)-1,3,5-triisopropylbenzene with an excess of epichlorohydrin according to the method described in U.S. Ser.

We claim:
1. A curable terpolymeric epoxide resin produced by a process which comprises heating at a temperature of at least 75° C. a reaction mixture comprising 1,4-bis(p-hydroxycumyl)benzene, from about 2 to about 10 mols of α,α′,α″-tris(hydroxyphenyl)-1,3,5-triisopropylbenzene for each mol of 1,4-bis(p-hydroxycumyl)benzene present and from about 5 to about 50 mols of epichlorohydrin for each mol of phenolic reactant present, in the presence of an alkali and recovering the resultant epoxide.
2. An epoxide resin according to claim 1 wherein from about 2 to about 4 mols of an alkali metal hydroxide is present for each mol of phenolic reactant.
3. An epoxide resin according to claim 1 wherein the heating is conducted in the presence of at least about 0.3 percent up to about 5 percent by weight of water based on the total weight of reactants.
4. An epoxide resin according to claim 1 wherein the reaction mixture is heated at a temperature from about 90° C. up to its reflux temperature.
5. A cured terpolymeric epoxide resin having a high heat distortion temperature produced by curing the resin of claim 1 with a epoxide curing agent.
6. A cured terpolymeric epoxide resin having a high heat distortion temperature produced by curing the resin of claim 1 with a polyamine curing agent.

References Cited

UNITED STATES PATENTS 3,301,818   1/1967   Barton et al. _____ 260—47
3,309,339   3/1967   Barton et al. _____ 260—47

WILLIAM H. SHORT, *Primary Examiner.*

T. D. KERWIN, *Assistant Examiner.*